US008615507B2

(12) United States Patent
Varadarajulu et al.

(10) Patent No.: US 8,615,507 B2
(45) Date of Patent: Dec. 24, 2013

(54) DATABASE MANAGEMENT

(75) Inventors: Gopikrishnan Varadarajulu, Bangalore (IN); Abhishek Iyer, Bangalore (IN); Pallavi Gupta, Lucknow (IN)

(73) Assignee: International Business Machines Corporation, Armonk, NY (US)

( * ) Notice: Subject to any disclaimer, the term of this patent is extended or adjusted under 35 U.S.C. 154(b) by 737 days.

(21) Appl. No.: 12/343,052

(22) Filed: Dec. 23, 2008

(65) Prior Publication Data

US 2010/0161649 A1 Jun. 24, 2010

(51) Int. Cl.
*G06F 17/30* (2006.01)
(52) U.S. Cl.
USPC .......................... 707/718; 707/769
(58) Field of Classification Search
USPC ......................... 707/713–721, 769
See application file for complete search history.

(56) References Cited

U.S. PATENT DOCUMENTS

| | | | |
|---|---|---|---|
| 6,684,203 B1* | 1/2004 | Waddington et al. | 707/714 |
| 6,847,978 B2* | 1/2005 | Ellis et al. | 707/713 |
| 7,133,861 B2 | 11/2006 | Day et al. | |
| 7,634,459 B1* | 12/2009 | Eshet et al. | 1/1 |
| 7,743,053 B2* | 6/2010 | Al-Omari et al. | 707/718 |
| 2004/0243555 A1* | 12/2004 | Bolsius et al. | 707/3 |
| 2005/0125409 A1* | 6/2005 | Day et al. | 707/10 |
| 2006/0074874 A1 | 4/2006 | Day et al. | |
| 2007/0033159 A1* | 2/2007 | Cherkauer | 707/2 |
| 2008/0177694 A1* | 7/2008 | Chaudhuri et al. | 707/2 |
| 2008/0256025 A1* | 10/2008 | Bestgen et al. | 707/2 |

\* cited by examiner

*Primary Examiner* — Fred I Ehichioya
*Assistant Examiner* — Michelle Owyang
(74) *Attorney, Agent, or Firm* — Elissa Wang; Edell, Shapiro & Finnan, LLC

(57) ABSTRACT

There is disclosed a system and method for optimising database access plans. Specifically, modifications made to a database are monitored and compared to a set of criteria. If a modification satisfies a criterion, the access plans relating to the modification are updated.

19 Claims, 6 Drawing Sheets

DATABASE MANAGEMENT

FIELD OF THE INVENTION

This disclosure generally relates to database management, and more specifically to optimising database access plans.

BACKGROUND

In a relational database management system a database query is usually broken down into a set of steps used to access the database information, also referred to as an access plan. For example, the following query:

```
SELECT *
FROM Company.Employee AS e
    INNER JOIN Person.Contact AS c
    ON e.ContactID = c.ContactID
    ORDER BY c.LastName
``` may be broken down into an access plan as shown in the following textual access plan:

```
Sort
(ORDER BY:([c].[LastName] ASC))
Nested Loops
(Inner Join, OUTER REFERENCES:([e].[ContactID], [Expr1004])
WITH UNORDERED PREFETCH)
Clustered Index Scan
(OBJECT:([AdventureWorks].[
Company].[Employee].[PK_Employee_EmployeeID] AS [e]))
Clustered Index
Seek(OBJECT:([AdventureWorks].[Person].[Contact].-
[PK_Contact_ContactID] AS [c]),
SEEK:([c].[ContactID]=[AdventureWorks].[
Company].[Employee].[ContactID] as [e].[ContactID]) ORDERED
FORWARD)
```

A number of alternate ways to execute a given database query exist, each of these having widely varying performance. Thus, in order to increase the speed of database queries, typically a database query optimiser is employed. A query optimiser will select from the set of possible access plans, a access plan it deems to be most efficient according to a given criteria. As the task of generating a set of access plans and selecting the optimal access plan is a computationally expensive process, the optimal access plan is typically cached for future use. In this manner, when a database management system receives a query for which an access plan has already been computed, an access plan from cache may be retrieved and used instead. Using this method, the database query will typically take a long time to execute on its first iteration when compared to subsequent iterations.

A number of disadvantages are associated with existing approaches. For example, underlying data relating to the access plan may have changed, thereby rendering the access plan obsolete. Further, access plans may not be persistent across database management system instances. Therefore, every time the database management system is loaded the access plans will have to be regenerated resulting in a lower performance.

Therefore, there exists a need for a database management system that ameliorates one or more of the above mentioned disadvantages.

SUMMARY

According a first aspect of this disclosure, there is disclosed a computer implemented method, where an interrupt is received indicating a database modification. It is then determined if a database access plan is affected by the modification. If so, information related to the affected a database access plan is written to a plan update log. Thereafter, an interrupt indicating a modification of the plan update log is received. From the information, the database access plan is identified and updated.

According to a further aspect of this disclosure, there is disclosed a database system. In the system, a processor is configured for receiving an interrupt indicating that a database modification has taken place. The processor determines if any database access plans are affected by the modification. If so, information related to the affected database access plan is written to a plan update log in a storage device. Thereafter, the processor receives an interrupt indicating a modification of the plan update log. The processor identifies the affected database access plan from the information in the plan update log. The affected access plan is then updated.

DETAILED DESCRIPTION

Figure 1:
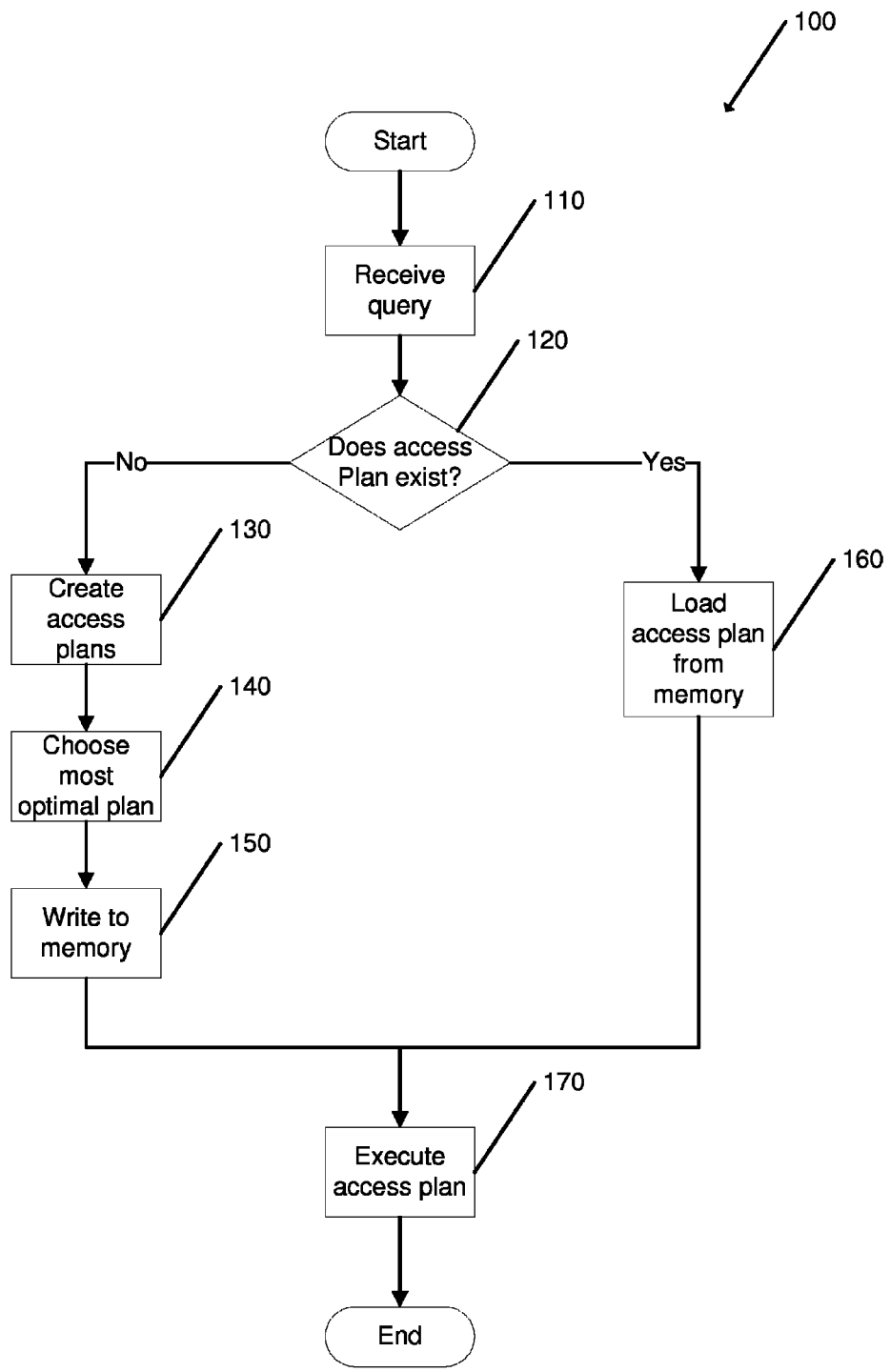
FIG. 1 shows the steps performed by a database management system upon receiving a database query.

Where reference is made in any one or more of the accompanying drawings to steps and/or features, which have the same reference numerals, those steps and/or features have for the purposes of this description the same function(s) or operation(s), unless the contrary intention appears.

FIG. 1 shows the steps performed by a database management system upon receiving a database query. The method 100 begins at step 110 in which a query is received by the database management system. Preferably, the query received by the database management system is devised using a standard structured query language (SQL). At step 120, the database management system determines if an existing access plan exists for the received query. If no access plan exists, a set of access plans are created by the query optimiser at step 130. At step 140, the most efficient access plan is chosen by the query optimiser. At step 150 the access plan is written to memory. At step 170 the access plan is executed. If, however, at step 120, the database management system determines that an access plan exists, the existing access plan is loaded from memory in step 160 and executed in step 170.

A logical unit of work (LUW) may create changes to the database that render certain access plans stored in memory obsolete. For example, access plans may be rendered obsolete by an operation of an LUW that creates or drops a table index, alters a table so as to create or delete a column or changes the constraints of a table. In circumstances such as these the access plans in memory need to be updated.

Figure 2:
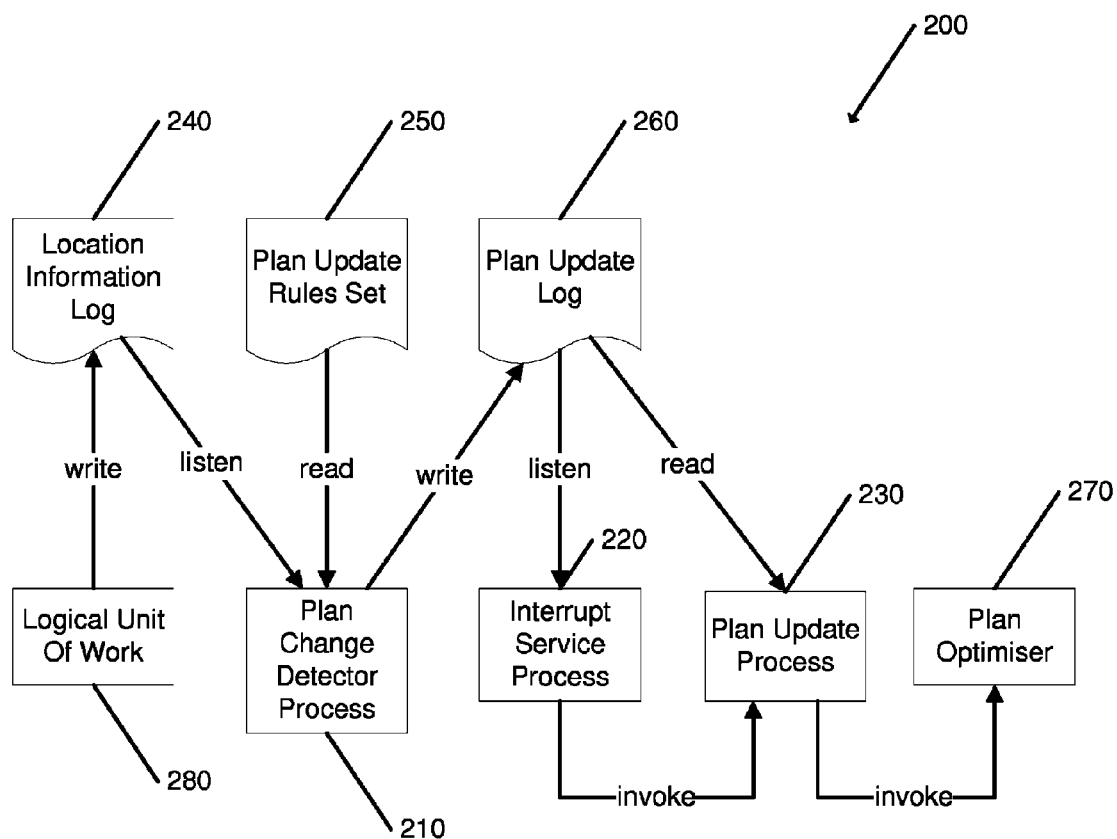
FIG. 2 shows a computer implemented system for updating an access plans in memory.

FIG. 2 shows a computer implemented system for updating stored access plans. The system executes three processes 210, 220, 230 typically within a multithreading environment. Each process 210, 220, 230 has a specific task for updating an access plan. The system 200 contains a location information log 240. All changes made by a LUW 280 are recorded in the location information log 240. For instance, if a database table were dropped, this operation would be recorded in the location information log 240.

The task of the plan change detector process 210 is to determine when an access plan in memory should be updated according to a set of rules contained in the plan update rules set 250. The plan change detector process 210 either periodically checks for changes in the location information log 240, or listens for location information log 240 change events. Once the plan change detector process 210 has determined that a change has taken place in the location information log 240, the process 210 uses the set of rules from the plan update rules set 250 to determine if the change made is one that warrants an access plan update.

If the plan change detector process 210 determines that at least one access plan in memory should be updated, it writes a plan update to the plan update log 260. The information written to the plan update log 260 may contain information such as the changes made to the database, the LUW in which the change took place, the database objects that were affected by the change or the address of the change in the location information log 240.

Table 1 shows a possible extract of the information from the plan update log 260.

TABLE 1

| SNo. | Package ID | Section ID | Tname | Loc info | Status |
|------|------------|------------|-------|----------|--------|
| 1 | Appl01 | 2 | Emp | I101230 | Completed |
| 2 | Appl02 | 19 | Pay | I101123 | Pending |
| 3 | Appl03 | 3 | Dept | I102342 | Pending |

The task of the interrupt service processor 220 is to listen for plan update log 260 change events. Once the interrupt service process 220 has received the plan update log 260 change event it invokes the plan update process 230.

The plan update process 230, once initiated, will read from the plan update log 260 to determine which access plans should be updated. The plan update process 230 is able to determine which access plans require updating from the information contained in the plan update log 260. Additionally, the plan update process is able to determine which access plans have been indirectly affected by scanning the package dependency information contained in the database. Once the plan update process 230 has determined which access plans require updating, it invokes the plan optimiser 270 to update the access plans.

Figure 3:
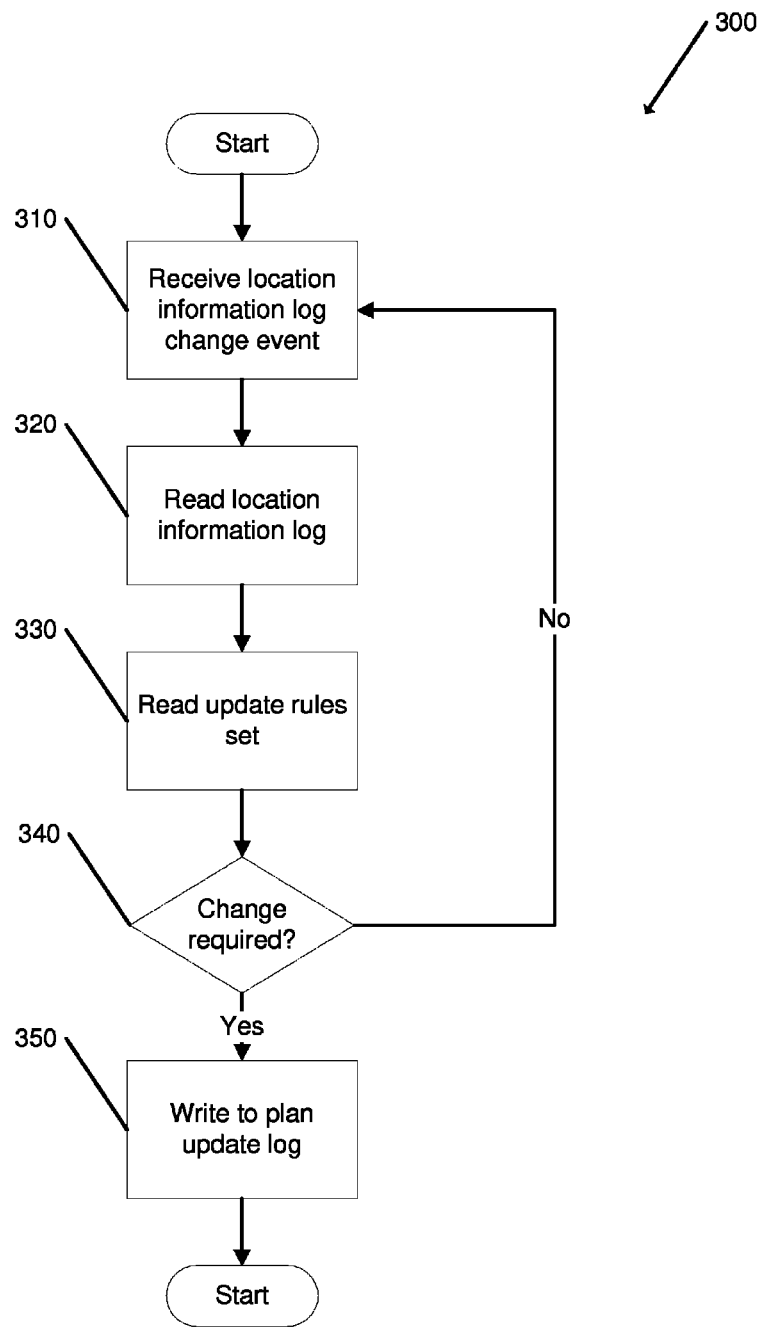
FIG. 3 shows the steps of the method performed by the plan change detector process.

FIG. 3 shows steps of the method performed by the plan change detector process 210. The method 300 begins at step 310 where the plan change detector process 210 receives a location information log 240 change event. Once a location information log 240 change event has been received the plan change detector 210 reads the location information log 240 at step 320. At step 330 the plan change detector process 210 reads the rules from the plan update rules set 250. At step 340 the plan change detector process 210 uses the rules from the plan update rules set 250 to determine if the information from the location information log 240 requires any access plans to be updated. If the plan change detector process 210 determines that no access plans require updating the method returns to step 310 where the plan change detector process 210 receives a location information log 240 change event. If the plan change detector process 210 decides that at least one access plan requires updating the plan update is written to the plan update log 260 at step 350. Information written to the plan update log 260 may contain information such as the LUW in which the change took place, the database objects that are involved in the change, or the address of the change in the location information log 240.

Figure 4:
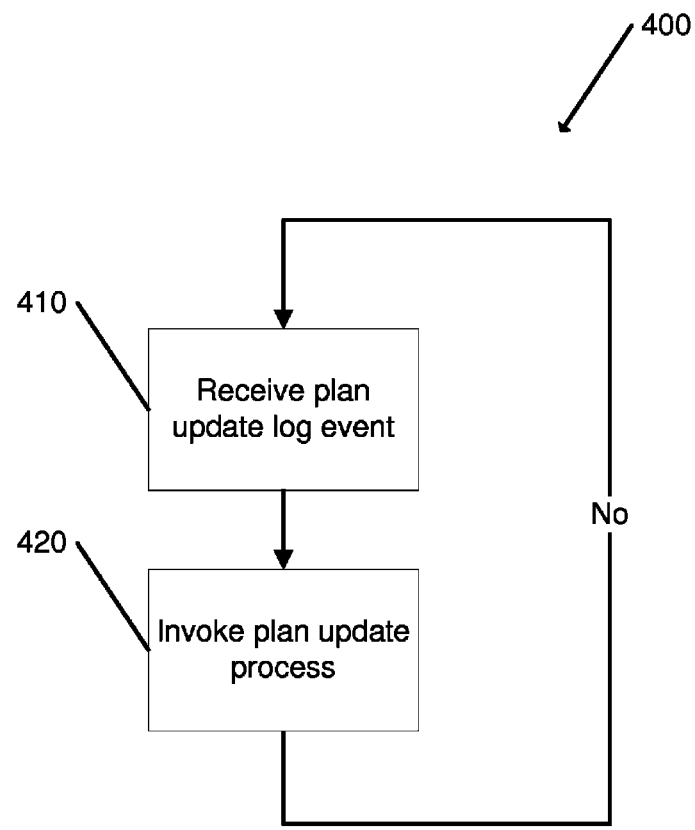
FIG. 4 shows the steps of the method performed by the interrupt service process.

FIG. 4 shows the steps of the method performed by the interrupt service process 220. The method 400 beings at step 410 where the interrupt service process receives the plan update log 260 update event. Once the interrupt service process 220 has received the plan update log 260 update event, the interrupt service process 220 invokes the plan update process 230.

Figure 5:
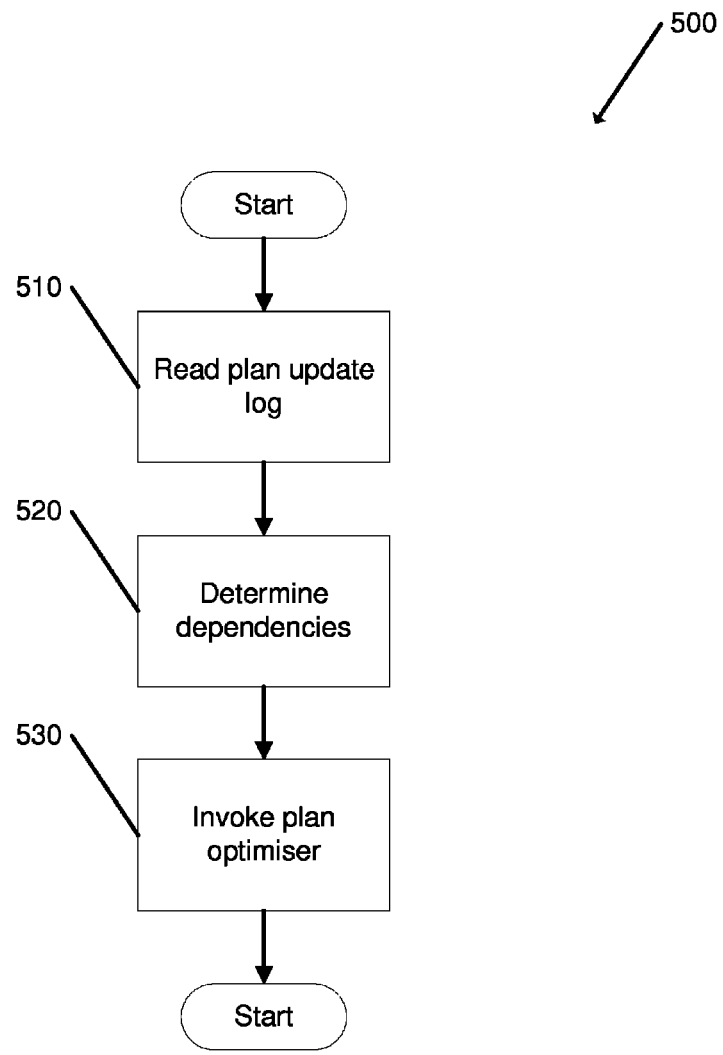
FIG. 5 shows the steps of the method performed by the plan update processor.

FIG. 5 shows the steps of the method performed by the plan update processor 230. The method 500 begins at step 510 where the plan update process 230 reads the plan update from the plan update log 260. At step 520 the plan update process 230 scans the package dependency information in the database to determine other database entities which may have been modified. In this manner the plan update process 230 is able to determine other access plans that have been indirectly affected and also require updating. At step 530, the plan update process 230 invokes the plan optimiser 270 to update the access plans that require updating.

Figure 6:
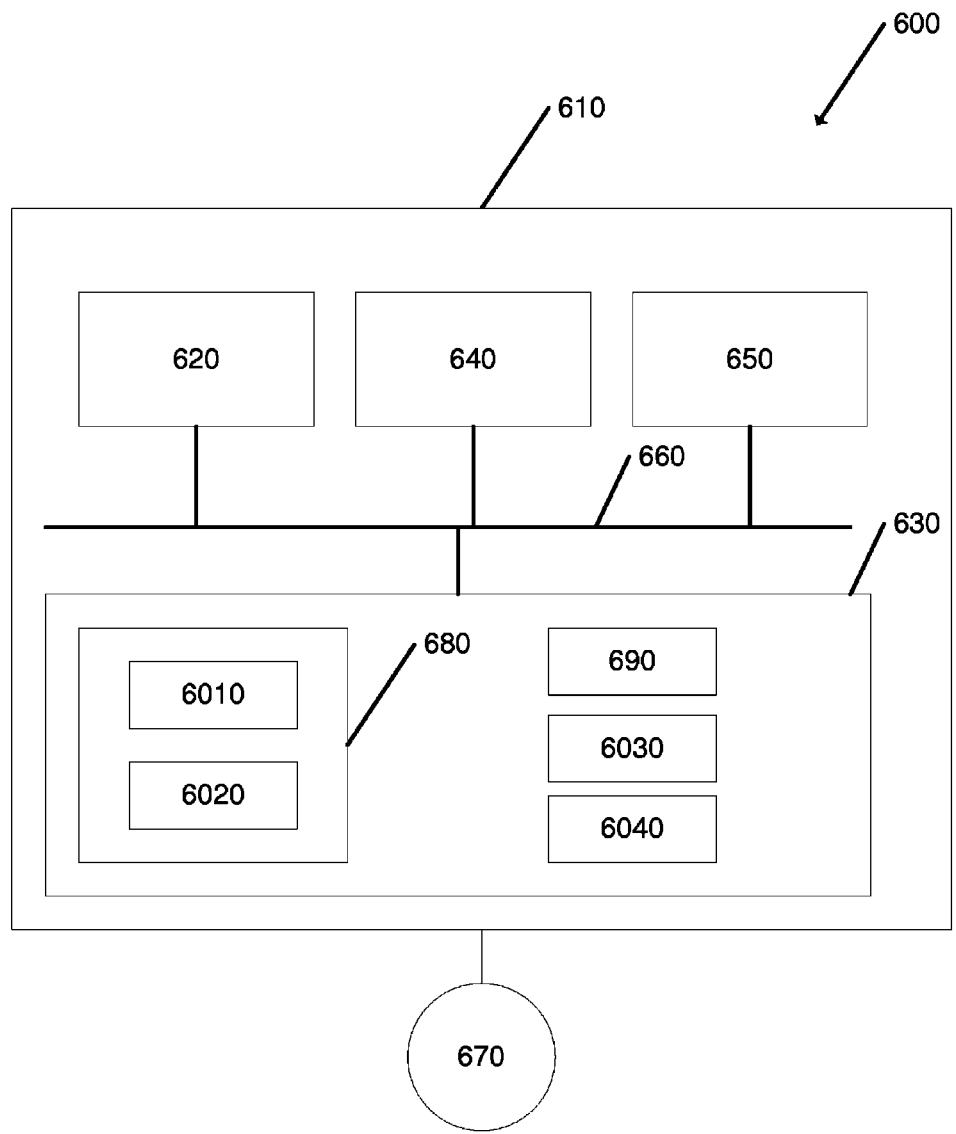
FIG. 6 shows a high level diagram of a database system.

FIG. 6 shows a high level diagram of an example system 600 for implementing embodiments of the present invention. The system 600 comprises an electronic device 610 connected to a network 670. In certain embodiments the network 670 may not be used, not be connected or not be present. The electronic device 610 includes a processor 620, an input device 640, an output device 650, a bus 660 and a storage device 630. The processor 620 represents a central processing unit and may include any type of architecture, such as CISC (Complex Instruction Set Computing) or RISC (Reduced Instruction Set Computing). Although a single processor 620 is shown multiple processors may be used in a manner known in the art. Bus 660 is used to transfer data between the processor 620, input device 640, output device 650 and the storage device 630. The bus 660 may represent one or more buses including PCI (Peripheral Component Interconnect), ISA (Industry Standard Architecture), X-BUS or EISA (Extended Industry Standard Architecture). The network 670 may be any suitable network or combination of networks including wireless communication or hard wired communication such as telephone line or cable. The network 670 may support the Ethernet IEEE (Institute of Electrical and Electronics Engineers) 802.3X specification. In another embodiment, the network 670 may support IP (Internet Protocol). In one embodiment the network 670 is a Local Area Network (LAN) and in another embodiment the network 670 is a Wide Area Network (WAN). In another embodiment, the network 670 may be a GPRS (General Packet Radio Service) network. The input device 640 may be a keyboard, mouse, track ball, touch screen, keypad, microphone or any appropriate device for a user to input data. Although one input device 640 is shown an embodiment may include multiple input devices. The output device 650 is used to present output to the user. The output device 650 may be a Liquid Crystal Display (LCD) display or a Cathode-ray Tube (CRT) display. Although only one output device 650 is shown an embodiment may include any number of output devices. The storage device 630 represents a device for storing data. The storage device 630 may any storage device including Read Only Memory (ROM), Random Access Memory (RAM), magnetic disk storage media, optical storage media or flash memory. Although one storage device 630 is shown an embodiment may include multiple storage devices. The storage device 630 may include a Database Management System (DMS) 680, a program object 6030, a job space 6040 and a database 690. The DMS 680, program object 6030, job space 6040 and database 690 may exist in any number and also in any number of storage devices. The database management system 680 includes a query engine 6020 and a query optimiser 6010. The query optimiser 6010 converts a database query into an access plan which in turn is used by the query engine 6020 to perform the request against the database 690. The program object 6030 contains machine code instructions that are executed by the processor 620. The job space stores data related to any particular job of the processor 620.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method for managing a database, the method comprising:
    applying a database modification to a database entity based on a database modification request;
    recording the database modification in a database modification log;
    periodically checking the database modification log to determine whether the database modification triggers at least one database access plan update based on a set of rules;
    storing information related to the at least one database access plan update in a plan update log when determined that the database modification triggered the at least one database access plan update, wherein the information indicates modification made to the database;
    receiving an interrupt indicating a modification of the plan update log to invoke a database access plan update process;
    identifying a database access plan in condition for an update from the information in the plan update log;
    scanning dependency information within the database and utilizing the dependency information to determine one or more other database entities modified by the database modification and identify one or more other database access plans indirectly affected by the database modification and in condition for an update; and
    updating the identified database access plan and the one or more other database access plans in condition for the update.

2. The method of claim 1, wherein the step of periodically checking comprises reading information regarding the database modification from the database modification log.

3. The method of claim 1, wherein the step of periodically checking comprises reading the set of rules, and executing the rules, wherein results of executing the rules are used to determine whether the database access plan is affected by the database modification or whether the database access plan is unaffected by the database modification.

4. The method of claim 1, wherein the step of scanning comprises:
    reading dependency information for the database, and making a determination for whether other access plans are affected by the database modification or whether other access plans are not affected by the database modification.

5. The method of claim 1, wherein the step of updating comprises invoking a plan optimiser to update the identified database access plan and the one or more other database access plans in condition for the update.

6. The method of claim 1, wherein a database for which the database modification applies is a relational database management system, wherein the database modification request is a structured query language (SQL) request, wherein the database access plan comprises a set of steps used to access information of the relational database management system, wherein the set of steps is used by the relational database management system to respond to the SQL request.

7. The method of claim 1, wherein an updated database access plan is used to handle subsequent requests that are substantially equivalent to the database modification request, wherein in absence of the updating of the identified database access plan per said method, subsequent requests that are substantially equivalent to the database modification request will be handled in accordance with an unmodified version of the identified database access plan that was stored before the periodically checking step was executed.

8. The method of claim 1, further comprising:
    executing a logical unit of work (LUW) responsive to the database modification request;
    responsive to executing the logical unit of work, creating changes to a database associated with the database modification, wherein said created changes render at least one previously stored database access plan for the database obsolete;
    determining that a database access plan is affected by the database modification and specifically has been affected so as to make the previously stored database access plan obsolete; and
    updating the database access plan that was previously obsolete so that the updated database access plan is no longer obsolete given the changes to the database.

9. The method of claim 1, wherein the database modification alters a table of a database so as to create or delete a column of the table, which renders the determined database access plan obsolete, wherein the updated database access plan is not obsolete in light of the table alteration that occurs responsive to the database modification request.

10. The method of claim 1, wherein the database modification creates or drops a table index of a database, which renders the determined database access plan obsolete, wherein the updated database access plan is not obsolete in light of the table index adjustment that occurs responsive to the database modification request.

11. The method of claim 1, wherein the database modification changes constraints on a table of a database, which renders the determined database access plan obsolete, wherein the updated database access plan is not obsolete in light of the constraint changes that occur responsive to the database modification request.

12. The method of claim 1, wherein the information stored in the plan update log related to the plan update comprises a logical unit of work (LUW) in which a change made in response to the database modification request took place, a set of database objects that are involved in the change, or an address of the change.

13. A database system comprising:
   a processor configured to apply a database modification to a database entity based on a database modification request, record the database modification in a database modification log, and periodically check the database modification log to determine whether the database modification triggers at least one database access plan update based on a set of rules; and
   a storage device for storing information related to the at least one database access plan update in a plan update log when determined that the database modification triggered the at least one database access plan update, wherein the information indicates modification made to the database access plan in condition for an update;
   wherein the processor is further configured to:
      indicate a modification of the plan update log to invoke a database access plan update process;
      identify a database access plan in condition for an update from the information in the plan update log;
      scan dependency information within the database and utilize the dependency information to determine other database entities modified by the database modification and identify one or more other database access plans indirectly affected by the database modification and in condition for an update; and
      update the identified database access plan and the one or more other database access plans in condition for the update in the storage device.

14. The system of claim 13, wherein the processor reads information regarding the database modification request from the database modification log in the storage device.

15. The system of claim 13, wherein the processor reads the set of rules from the storage device, and executes the rules, wherein results of executing the rules are used to determine whether the database access plan is affected by the database modification or whether the database access plan is unaffected by the database modification.

16. The system of claim 13, wherein the processor reads dependency information for the database from the storage device, and makes a determination for whether other access plans are affected by the database modification or whether other access plans are not affected by the database modification.

17. The system of claim 13, wherein the processor invokes a plan optimiser to update the identified access plan and the one or more other database access plans in condition for the update in the storage device.

18. A computer program product for managing a database, the computer program product comprising:
   one or more non-transitory computer-readable storage mediums;
   program instructions, stored on at least one of the one or more non-transitory computer-readable storage mediums, to apply a database modification to a database entity based on a database modification request;
   program instructions, stored on at least one of the one or more non-transitory computer-readable storage mediums, to record the database modification in a database modification log;
   program instructions, stored on at least one of the one or more non-transitory computer-readable storage mediums, to periodically check the database modification log to determine whether the database modification triggers at least one database access plan update based on a set of rules;
   program instructions, stored on at least one of the one or more non-transitory computer-readable storage mediums, to store information related to the at least one database access plan update in a plan update log when determined that the database modification triggered the at least one database access plan update, wherein the information indicates modification made to the database;
   program instructions, stored on at least one of the one or more non-transitory computer-readable storage mediums, to receive an interrupt indicating a modification of the plan update log to invoke a database access plan update process;
   program instructions, stored on at least one of the one or more non-transitory computer-readable storage mediums, to identify a database access plan in condition for an update from the information in the plan update log;
   program instructions, stored on at least one of the one or more non-transitory computer-readable storage mediums, to scan dependency information within the database and utilize the dependency information to determine one or more other database entities modified by the database modification and identify one or more other database access plans indirectly affected by the database modification and in condition for an update; and
   program instructions, stored on at least one of the one or more non-transitory computer-readable storage mediums, to update the identified database access plan and the one or more other database access plans in condition for the update.

19. The computer program product of claim 18, further comprising:
   program instructions, stored on at least one of the one or more non-transitory computer-readable storage mediums, to execute a logical unit of work (LUW) responsive to the database modification request;
   program instructions, stored on at least one of the one or more non-transitory computer-readable storage mediums, to, responsive to executing the logical unit of work, create changes to a database associated with the database modification, wherein said created changes render at least one previously stored database access plan for the database obsolete;
   program instructions, stored on at least one of the one or more non-transitory computer-readable storage mediums, to determine that a database access plan is affected by the database modification and specifically has been affected so as to make the previously stored database access plan obsolete; and
   program instructions, stored on at least one of the one or more non-transitory computer-readable storage mediums, to update the database access plan that was previously obsolete so that the updated database access plan is no longer obsolete given the changes to the database.

* * * * *